March 9, 1926. 1,575,790
E. J. PICKERELL
LUGGAGE CARRIER MOUNTING
Filed August 1, 1925    2 Sheets-Sheet 2
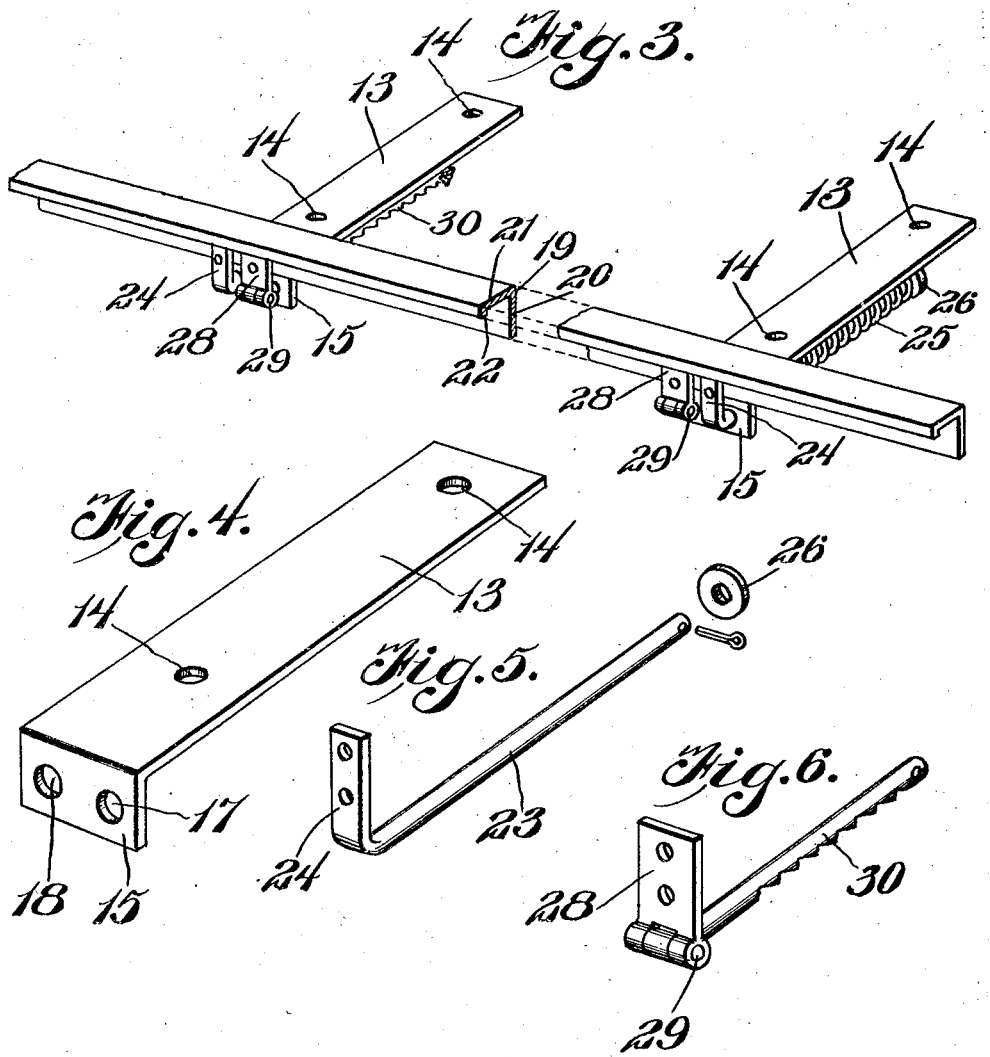
Inventor
Ernest J. Pickerell
By Watson E. Coleman
Attorney Patented Mar. 9, 1926.

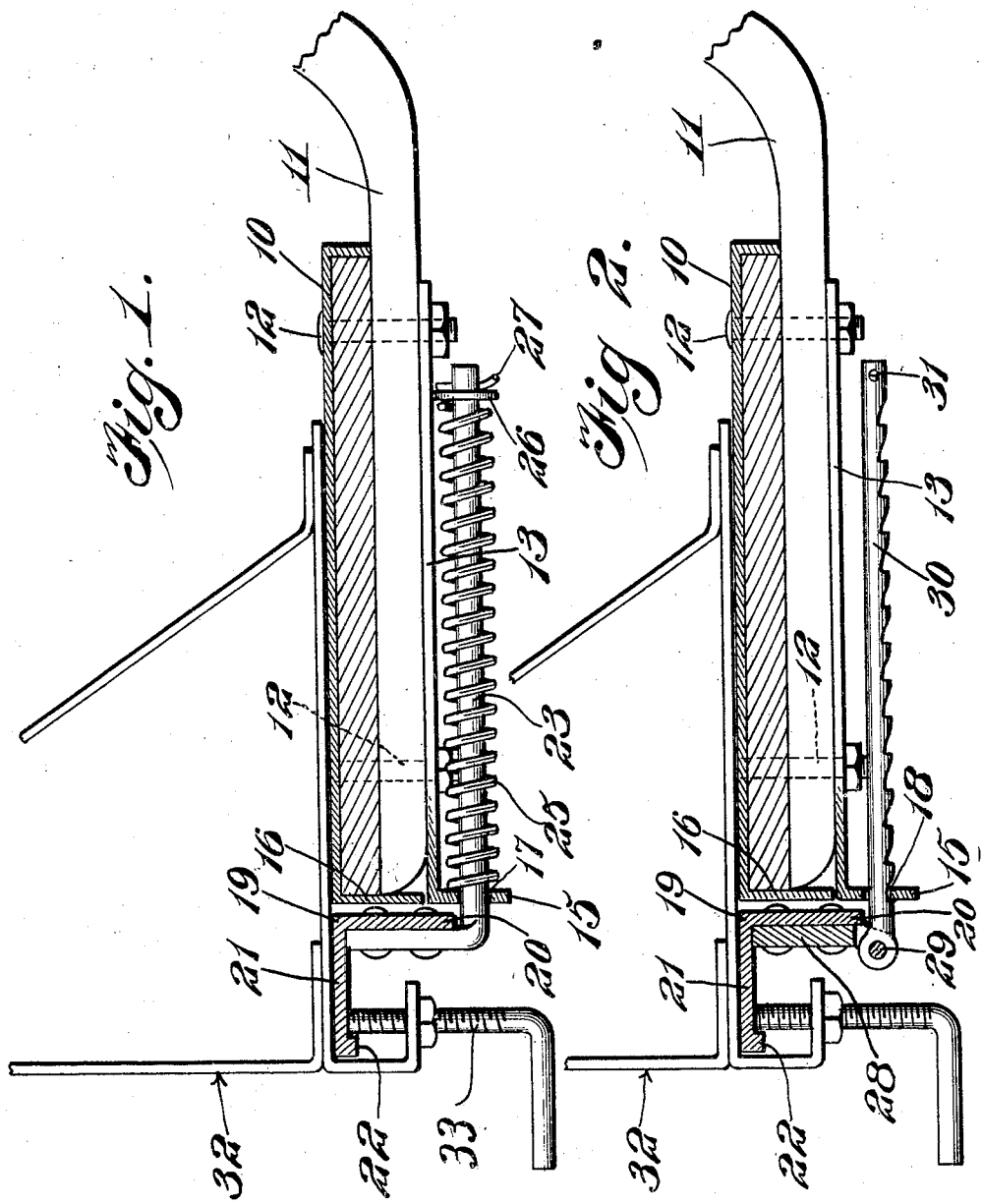

1,575,790

UNITED STATES PATENT OFFICE.

ERNEST J. PICKERELL, OF EDDYVILLE, IOWA.

LUGGAGE-CARRIER MOUNTING.

Application filed August 1, 1925. Serial No. 47,563.

*To all whom it may concern:*

Be it known that I, ERNEST J. PICKERELL, a citizen of the United States, residing at Eddyville, in the county of Mahaska and State of Iowa, have invented certain new and useful Improvements in Luggage-Carrier Mountings, of which the following is a specification, reference being had to the accompanying drawings.

This invention relates to luggage carrier mountings and more particularly to a device for use in mounting the ordinary luggage carrier of a vehicle upon the running board thereof so that it may be extended to increase the storage space afforded.

An important object of the invention is to provide a device of this character which may be readily applied to a vehicle without in any manner altering the present construction thereof and which may be readily and cheaply produced.

A further object of the invention is to provide means for positively locking the luggage carrier support in its adjusted positions, which is readily released to permit the carrier to return to its normal position.

These and other objects I attain by the construction shown in the accompanying drawings, wherein for the purpose of illustration is shown a preferred embodiment of my invention and wherein:—

Figure 1 is a vertical sectional view showing a luggage carrier support constructed in accordance with my invention applied to a running board;

Figure 2 is a similar section and illustrating the mounting and operation of the ratchet bars;

Figure 3 is a perspective of the luggage carrier support removed from the running board;

Figure 4 is a perspective of the guide bar;

Figure 5 is a perspective of the tension bar;

Figure 6 is a perspective of the ratchet bar and its attaching plate.

Referring now more particularly to the drawings, the numeral 10 indicates the usual running board of a vehicle and 11 the braces thereof to which the running board is secured by means of bolts 12 extending vertically through the running board and through the braces. There are at least two of these braces applied to each running board and in accordance with my invention, I provide a framework including bars 13 corresponding in number to the running board braces and having openings 14 through which the securing elements 12 of the running board may be directed so that these plates may be secured upon the under surface of the running board. The outer end of each bar has a down-turned portion 15 aligning with the outer edge 16 of the running board and this downturned portion has a pair of spaced openings 17, 18 formed therein, the purpose of which will hereinafter appear.

I further provide an angle bar 19, one flange 20 of which is vertically disposed and confronts the outer face of the running board and the other flange 21 of which is horizontally disposed and has its upper surface flush with the upper surface of the running board. The outer edge of this last named flange is provided with a depending rib 22, the purpose of which will presently appear.

Secured to the vertical flange 20 at spaced points are a pair of bars 23, each bar having an upturned forward end 24 by means of which it is attached to the flange 20. These bars are slidably directed through the opening 17 of the downturned ends 15 of the bars 13. Rearwardly of the downturned portion 15, the bar has mounted thereon springs 25, the rear ends of which abut washers 26 suitably maintained in position upon the bars 23, as at 27. It will be obvious that as the angle bar is drawn forwardly, the springs 25 will be compressed and will tend to return this bar to the position where its flange 20 directly confronts the outer edge of the running board.

Secured to the flange 20 adjacent each portion 24 of the bars 23 is a plate 28 to which are hingedly connected, as at 29, ratchet bars 30 directed through the openings 18 and having their ratchet faces engaged against the lower edges of these openings by gravity. Through the inner ends of these ratchet bars are directed cotter keys 31 or the like for limiting movement of the ratchet bars through the opening. It will be obvious that as the angle bar is drawn outwardly from the running board, these ratchet bars will serve to prevent the return action normally tended to by the springs 25 and accordingly the angle bar will be held in its adjusted position until the inner ends of the ratchet bars 30 are engaged with the hands and moved upwardly so that the bar 19 is released for movement.

In the use of the device, the ordinary type of luggage carrier, generally designated at 32, may be applied to the horizontal flange, the securing element 33 of the luggage carrier engaging the flange behind the shoulder 22 thereof so that displacement of the carrier in event of loosening of the securing element is prevented. In order that the bar 19 may be supported in its extended position, the washers 26 are preferably of such size that they engage against the under surfaces of the bars 13 and provide a limit, preventing oscillation of the rods 23 in a vertical plane to a point above the horizontal.

It will be obvious that a structure of this character where the inner ends of the rods are unlimited as to transverse movement, it will be possible to extend one end of the luggage carrier further than the other end is extended, thus allowing the luggage carrier to be accommodated to articles of uneven size.

It will be obvious that the construction hereinbefore set forth is obviously capable of a certain range of change and modification without departing from the spirit of the invention and I accordingly do not limit myself to such specific structure except as hereinafter claimed.

I claim:—

1. In a luggage carrier support, a bar confronting the outer edge of the running board, guides secured to the under surface of the running board, rods secured to said bar and directed through openings formed in said guides including rigid rods guiding and supporting the first named bar in its extended position and pivoted ratchet rods preventing return movement of the bar, means normally tending to move the bar in confronting relation to the outer edge of the running board and means upon the bar permitting attachment thereto of a luggage carrier.

2. In a luggage carrier support, a bar confronting the outer edge of the running board, guides secured to the under surface of the running board, rods secured to said bar and directed through openings formed in said guides including rigid rods guiding and supporting the first named bar in its extended position and pivoted ratchet rods preventing return movement of the bar, means normally tending to move the bar in confronting relation to the outer edge of the running board, said bar having a horizontal outwardly directed flange.

3. In a luggage carrier support, a bar confronting the outer edge of the running board, guides secured to the under surface of the running board, rods secured to said bar and directed through openings formed in said guides including rigid rods guiding and supporting the first named bar in its extended position and pivoted ratchet rods preventing return movement of the bar, means normally tending to move the bar in confronting relation to the outer edge of the running board, said bar having a horizontal outwardly directed flange provided upon its under surface adjacent its outer edge with a depending rib.

4. In a luggage carrier, an angle bar having one flange thereof confronting the outer edge of the running board, guides secured to the under surface of the running board and having openings, rigid rods secured to said flange of the angle bar and extending rearwardly through openings formed in the guides, brackets secured to said flange, ratchet bars pivoted to said brackets and likewise directed through openings formed in said guides and means constantly urging the angle bar toward the running board.

5. In a luggage carrier, an angle bar having one flange thereof confronting the outer edge of the running board, guides secured to the under surface of the running board and having openings, rigid rods secured to said flange of the angle bar and extending rearwardly through openings formed in the guides, brackets secured to said flange, ratchet bars pivoted to said brackets and likewise directed through openings formed in said guides, means constantly urging the angle bar toward the running board comprising springs mounted on said rigid rods and extending between the rear faces of the guides and stop elements carried by the rods.

6. In a luggage carrier, an angle bar having one flange thereof confronting the outer edge of the running board, guides secured to the under surface of the running board and having openings, rigid rods secured to said flange of the angle bar and extending rearwardly through openings formed in the guides, brackets secured to said flange, ratchet bars pivoted to said brackets and likewise directed through openings formed in said guides and means constantly urging the angle bar toward the running board, said guides including portions overlying the inner ends of rods, the inner ends of the rods having elements contacting said portions to prevent oscillation of the rods.

7. In a luggare carrier support, a bar confronting the outer edge of the running board, guides secured to the under surface of the running board, rods secured to said bar and directed through openings formed in said guides including rigid rods guiding and supporting the first named bar in its extended position and pivoted ratchet rods preventing return movement of the bar, means normally tending to move the bar in confronting relation to the outer edge of the running board, said bar having a horizontal outwardly directed flange, the inner ends of said rods being free for oscillation in a plane paralleling the under surface of the running board.

8. In a luggage carrier, an angle bar having one flange thereof confronting the outer edge of the running board, guides secured to the under surface of the running board and having openings, rigid rods secured to said flange of the angle bar and extending rearwardly through openings formed in the guides, brackets secured to said flange, ratchet bars pivoted to said brackets and likewise directed through openings formed in said guides, means constantly urging the angle bar toward the running board comprising springs mounted on said rigid rods and extending between the rear faces of the guides and stop elements carried by the rods, said ratchet bars and rigid rods being free for oscillation in a plane substantially paralleling the plane of the running board.

In testimony whereof I hereunto affix my signature.

ERNEST J. PICKERELL.